(12) United States Patent
Marsden et al.

(10) Patent No.: US 11,867,850 B2
(45) Date of Patent: Jan. 9, 2024

(54) SCINTILLATION DETECTOR

(71) Applicant: KROMEK LIMITED

(72) Inventors: Edward Marsden, Huddersfield (GB); John Atkins, Sedgefield (GB)

(73) Assignee: KROMEK LIMITED, Sedgefield (GB)

( * ) Notice: Subject to any disclaimer, the term of this patent is extended or adjusted under 35 U.S.C. 154(b) by 0 days.

(21) Appl. No.: 17/784,242

(22) PCT Filed: Dec. 11, 2020

(86) PCT No.: PCT/GB2020/053182
§ 371 (c)(1),
(2) Date: Jun. 10, 2022

(87) PCT Pub. No.: WO2021/116698
PCT Pub. Date: Jun. 17, 2021

(65) Prior Publication Data
US 2023/0041132 A1 Feb. 9, 2023

(30) Foreign Application Priority Data

Dec. 12, 2019 (GB) ...................... 1918337

(51) Int. Cl.
*G01T 1/20* (2006.01)
*G01T 1/16* (2006.01)
*G01T 1/208* (2006.01)
(52) U.S. Cl.
CPC ............ *G01T 1/1603* (2013.01); *G01T 1/208* (2013.01); *G01T 1/20188* (2020.05)

(58) Field of Classification Search
CPC ... G01T 1/1603; G01T 1/20188; G01T 1/208; G01T 1/2018
See application file for complete search history.

(56) References Cited

U.S. PATENT DOCUMENTS

| | | | |
|---|---|---|---|
| 2009/0140153 A1* | 6/2009 | Flamanc | G01T 1/20185 250/483.1 |
| 2016/0214966 A1* | 7/2016 | Kunimoto | G03F 7/033 |
| 2018/0246229 A1* | 8/2018 | Preston | G01T 1/16 |
| 2020/0174140 A1* | 6/2020 | McLaughlin, II | G01T 1/2018 |

FOREIGN PATENT DOCUMENTS

| | | |
|---|---|---|
| EP | 3232228 A1 | 10/2017 |
| WO | WO2017083114 A1 | 5/2017 |

OTHER PUBLICATIONS

ISA/EP, European Patent Office, International Search Report, dated Feb. 16, 2021, 3 pages, European Patent Office.

* cited by examiner

*Primary Examiner* — David P Porta
*Assistant Examiner* — Mamadou Faye
(74) *Attorney, Agent, or Firm* — Ference & Associates LLC

(57) ABSTRACT

A radiation detector assembly is described comprising: a scintillator; a photodetector; a hermetic enclosure surrounding and defining an enclosure volume that contains the scintillator and the photodetector; wherein the enclosure comprises a wall of plastics material coated with a metal layer. A method of assembly of a radiation detector assembly is also provided.

20 Claims, 3 Drawing Sheets

SCINTILLATION DETECTOR

The present application is a National Phase Entry of PCT International Application No. PCT/GB2020/053182, which was filed on Dec. 11, 2020, and which claims priority to Application No. 1918337.5 filed in Great Britain on Dec. 12, 2019, the contents of which are hereby incorporated by reference.

The invention relates to a scintillation detector such as might be used for example for the detection of ionising radiation including high-energy electromagnetic radiation and in particular gamma rays, or for the detection of subatomic particle radiation including neutrons. The invention in particular relates to an enclosure system and method for a radiation detector assembly incorporating a scintillation detector. The invention in particular relates to modifications to a scintillation detector enclosure system with a view to adapting the same for use in or as a portable radiation detector device. The invention further relates to a portable radiation detector device including such an enclosed scintillation detector assembly.

BACKGROUND TO THE INVENTION

It is a long-established principle that an efficient radiation detector can be constructed for the detection of high-energy ionising radiation using in combination a scintillator material which exhibits scintillation when excited by the ionising radiation and emits photons as a result, and a photodetector to detect those photons. The photodetector enables an electrical signal to be obtained indicative of the response of the scintillator, and consequently from which incoming radiation incident at the scintillator can be detected and characterised.

The use of a scintillation detector comprising a scintillator and a suitable photodetector is widespread in the field of radiation detection and monitoring, and may find particular application in the development of compact portable and for example hand-held radiation monitoring meters, such as might be used for detecting and quantifying/characterising radioactive contamination, for the monitoring of radioactive materials and sources, for the monitoring of potentially contaminated environments and for similar applications. There is a general desire therefore to develop scintillation detectors in which the scintillator and detector and other suitable detection control systems and electronics can be associated together in a compact and efficient manner, for example in such a portable system.

Various scintillator materials are well known. Known scintillator materials include organic scintillators and inorganic scintillators. Certain inorganic scintillators may be particularly suited to use in compact detectors, and for example portable detectors. Known classes of inorganic scintillator include doped alkali halides, such as NaI(Tl), CsI(Tl), CsI(Na), LiI(Eu); other slow inorganics such as BGO, $CdWO_4$, ZnS(Ag); $Ce^{3+}$-activated fast inorganics such as lanthanum chloride ($LaCl_3$(Ce)), lanthanum bromide ($LaBr_3$(Ce)), CLLB ($Cs_2LiLaBr_6$(Ce)), GSO ($Gd_2SiO_5$(Ce)), YAP, YAG, LSO, LuAP, and the like. Many of this last class in particular are highly hygroscopic.

Suitable photodetectors, particularly for compact and for example portable operation, include photomultipliers. Suitable photomultipliers include photomultiplier tubes (PMT) and photodiodes. Solid state photomultipliers, including silicon photomultipliers (SiPMs) are particularly suited to application in compact and for example portable detectors.

Many effective inorganic scintillating materials are hygroscopic, some highly so, for example including NaI, $LaCl_3$, $LaBr_3$ and CLLB. If these materials are to be used for prolonged periods, they must be well protected from contamination with moisture.

When such inorganic scintillators are used in conjunction with compact solid-state photodetectors such as silicon photomultipliers (SiPMs), the scintillator and the photodetector may conveniently be packaged together in a single hermetically sealed enclosure. Conveniently furthermore, signal processing and power supply circuitry associated with the detector can also be integrated within this assembly.

For use in applications where size and weight are important, and in particular for example for hand-held detectors or other detectors where compact assembly is desired, the enclosure used to house such a detector assembly must be compact, lightweight and robust. It must also provide a reliable method for feeding signal and power connections to the photodetector and associated circuitry. Finally, particularly for the most hygroscopic scintillating materials, is should be suitable for assembly with simple tools and techniques, if necessary in an inert atmosphere such as using an inert atmosphere glovebox.

Conventional methods for enclosing such detector assemblies sometimes referred to as canning, are typically achieved using machined aluminium parts. However, this usually requires compromise, due to the limitations of machining (limiting for example inner corner radius), the wall thickness necessary to achieve strength, which is often greater than ideal and these and other considerations can lead to a higher volume and weight being required for the enclosure than is ideal, which may lead to significant attenuation of incident gamma radiation particularly at lower energies.

There is a general desire to provide an enclosure system and method for a scintillation detector assembly that mitigates one or more of the above disadvantages.

It is in particular desirable to provide an enclosure system and method for a scintillation detector assembly that effectively protects and hermetically seals hygroscopic scintillating materials.

It is particularly desirable to provide an enclosure system and method for a scintillation detector assembly that lends itself to the production of compact and for example portable and hand-held detectors.

SUMMARY OF INVENTION

In accordance with the invention in a first aspect, a radiation detector assembly comprises:
   a scintillator;
   a photodetector;
   a hermetic enclosure surrounding and defining an enclosure volume that contains the scintillator and the photodetector;
   wherein the enclosure comprises a wall of plastics material coated and for example electroplated with a metal layer.

The scintillator comprises a material adapted to exhibit a scintillation response to incident high-energy electromagnetic radiation and in particular gamma rays, or to subatomic particle radiation including neutrons, and thereby to emit photons, for example in or nearer to the visible range. The photodetector is optically coupled to the scintillator in the sense that it is positioned relative to the scintillator to receive at least a proportion of the said emitted photons and to generate an electrical signal in response. This electrical signal may be used to draw inferences regarding the radiation incident at the scintillator, whereby incoming radiation incident at the scintillator can be detected and characterised. To that extent it is a generally conventional scintillation detector.

At least the scintillator and the photodetector are contained within a hermetically sealed enclosure volume by a hermetic enclosure. Again, such enclosures are known.

However, the hermetic enclosure is distinctly characterised in that it is formed by a walled structure that comprises a wall of plastics material coated and for example electroplated with a metal layer. Thus, the primary structural part of the wall of the enclosure is formed of a plastics material which may be more readily formed into thinner and more complex shapes to provide low weight, high strength, compactness and complete flexibility in design to fit almost any scintillator shape, in a minimum overall size. The coated and for example electroplated metal layer completes an effective hermetic seal, allowing use of plastics materials that do not themselves alone effect such a seal, but as the plastics materials gives the major part of the structural strength, the metal layer may be a thin film, so that the overall structure minimises the weight and attenuation of incident radiation. For both these reasons, the use of the hermetic enclosure of the invention may confer technical advantages over traditional machined metal canning.

In particular, the plastics material which makes up the primary shape of the wall of the enclosure may be fabricated using one of a number of known techniques which allow for the creation of intricate geometries which additionally lend themselves to efficient and compact design, such as might be suitable to provide an environmental enclosure for a scintillator crystal intended for use in a compact detector or assembly, and for example a hand-held or otherwise portable detector assembly.

Suitable plastics fabrication methods may include without limitation machining, moulding such as injection moulding or blow moulding, thermoforming and stereolithographic printing. In possible embodiments, particularly where intricate geometries are desired, a stereolithographic printing method may be preferred, but in other situations other manufacturing methods may also be applicable. Such manufacturing methods may avoid some or all of the compromises which tend to be inherent in prior art machined metal enclosures such as machined aluminium enclosures.

Suitable plastics materials will readily suggest themselves to the skilled person depending upon the forming method being selected, and will include a range of thermoplastic and thermoset polymers. In the preferred case, where the enclosure is SLA printed, a suitable photocurable polymer is likely to be preferred.

The metal coating provides some additional strength to the enclosure, but its primary role is to ensure a hermetic environmental seal. This allows use of plastics materials for the body of the enclosure of a type and at a thickness that do not themselves effect such a seal, and thus would normally be considered unsuitable for the environmental canning of the scintillator and the photodetector, in combination with a thin film of metal. The composite structure synergistically combines the advantages of the plastics material, such as formability into complex shapes and reduced weight, and the advantages of the metal material in providing effective sealing, while at the same time mitigating the disadvantages of using either alone.

The metal coating is for example applied to an external surface of the enclosure. The metal coating is preferably formed as a thin film, for example no more than 1 mm thick, to minimise attenuation of incident radiation as if it passes through the enclosure towards a scintillator contained therein.

Any suitable thin film deposition method may be considered for application of the metal coating, including physical or chemical deposition methods. The metal coating is in a preferred embodiment electroplated.

The metal coating optionally comprises plural layers of the same or different composition. For example, plural layers of different composition may be applied having different properties. In a possible case, an inner metal layer may be disposed directly on an external surface of the plastics material of the hermetic enclosure materially selected to exhibit good adhesion properties on the surface of the plastics material. In a possible case, an outer metal layer may be provided to comprise an outermost surface of the composite enclosure materially selected to exhibit good environmental properties such as corrosion and/or scratch resistance (for example where an inner layer does not exhibit such properties). Further intermediate layers may be provided.

Suitable metals for coating on plastics include copper, zinc, chromium, silver, gold and alloys thereof and combinations of layers thereof.

A preferred coating thickness is between 5 µm and 300 µm.

The hermetic enclosure surrounds and defines an enclosure volume that contains the scintillator and the photodetector and is adapted to provide in use a hermetically isolated environment in the enclosure volume. This has the purpose of protecting the scintillator crystal in particular. Notably, many inorganic scintillator crystals are structurally delicate and/or hygroscopic. The enclosure provides mechanical and environment protection to such crystals.

It is the purpose of the enclosure to provide a hermetically sealed internal environment to the complete assembly in use. Accordingly, it is necessary that the enclosure is fully sealed once it is completely assembled.

Conveniently, the hermetic enclosure may comprise multiple components assembled together into such a complete and sealed whole and effecting such a seal when so assembled. In a convenient example of such an embodiment, the hermetic enclosure may comprise, assembled together, a body and a lid, wherein the body comprises a base and side walls primarily defining the enclosure volume, and thereby adapted to receive the scintillator, photodetector, and any other components of a detector assembly it may be desired to place therein, and onto which the lid is then applied and sealed. A suitable sealing adhesive may be used, for example a curable resin adhesive such as an epoxy resin adhesive.

It will be appreciated that it may be desirable to provide apertured portions in an enclosure wall, or a wall of a component of an enclosure, to provide an external connection to the components within the enclosure during use, for example a power or communications connection. It will be understood that the provision of such apertured portions prior to the completion of assembly of the enclosure is envisaged and encompassed within the scope of the invention. Such apertured portions will be sealed to complete the hermetic enclosure of the assembly on completion of the fabrication process. A suitable sealing adhesive may be used, for example a curable resin adhesive such as an epoxy resin adhesive.

In accordance with the invention at its most general in the first aspect, a radiation detector assembly is provided that comprises a hermetic enclosure defining, and sealable when assembled to environmentally isolate, an enclosure volume that contains at least a scintillator and a photodetector. The scintillator and photodetector may be of any suitable design, and in particular in the preferred case of a suitable compact design such that the assembly is capable of being incorporated into a compact and for example portable and hand-held instrument.

Suitable scintillator materials may include organic scintillators and inorganic scintillators. Certain inorganic scintillators may be particularly suited to use in an assembly in accordance with the invention. Known classes of inorganic scintillator include doped alkali halides, such as NaI(Tl), CsI(Tl), CsI(Na), LiI(Eu); other slow inorganics such as BGO, $CdWO_4$, ZnS(Ag); $Ce^{3+}$-activated fast inorganics such as lanthanum chloride ($LaCl_3$(Ce)), lanthanum bromide ($LaBr_3$(Ce)), CLLB ($Cs_2LiLaBr_6$(Ce)), GSO ($Gd_2SiO_5$(Ce)), YAP, YAG, LSO, LuAP, and the like. Many of this last class in particular are highly hygroscopic.

Suitable photodetectors, particularly for compact and for example portable operation, include photomultipliers. Suitable photomultipliers include photomultiplier tubes (PMT) and photodiodes. Solid state photomultipliers, including silicon photomultipliers (SiPMs) are particularly suited to application in compact and for example portable detectors.

The purpose of the enclosure is to provide environment and mechanical protection for a scintillator in particular. Many effective crystalline inorganic scintillating materials are hygroscopic and/or mechanically fragile. Examples include NaI, $LaCl_3$, $LaBr_3$ and CLLB. If these materials are to be used for long periods it is known that they must be well protected from contamination with moisture, and they have conventionally been protected by canning in machined metal containers such as machine aluminium containers. The invention is particularly advantageously applied to such materials, and accordingly a scintillator in an assembly accordance with the invention conveniently comprises such a material.

The scintillating material preferably comprises a crystalline scintillating material. The scintillating material is for example an inorganic crystalline scintillating material. The scintillating material is for example a single crystal.

The enclosure may further contain other appropriate components to facilitate the function of the detector assembly within a detector device, for example including without limitation a power source, such as a battery; a data processing module configured for one or more of: collecting electronic signals from the photodetector indicative of radiation incident at the scintillator, processing the collected data, analysing the collected data to draw inferences regarding the incident radiation; a data transmission module configured to transmit the collected data and/or the results of an analysis of the collected data to an external receiver and for example an external processor. The control and processing electronics may for example be performed by, the data processing module may correspondingly comprise, and the enclosure may correspondingly contain, a suitable ASIC.

The enclosure may optionally further contain means configured to receive data from an external control system; means to receive power from an external power source.

More completely, the invention preferably comprises a radiation detector including at least one radiation detector assembly in accordance with the first aspect of the invention, the radiation detector additionally including and/or being adapted to communicate remotely with suitable control and processing electronics.

The radiation detector may additionally include and/or be adapted to connect remotely with a suitable power source. The power source may be a battery and for example a rechargeable battery.

The radiation detector may include a suitable display adapted to display information regarding detected radiation.

The radiation detector may include a wired or wireless transmitter or transceiver adapted to communicate information regarding detected radiation to/with a remote data station.

The radiation detector may include a suitable housing.

In a preferred embodiment, the radiation detector is adapted to be portable, and for example adapted to be hand-held in use. For example, it comprises a housing adapted to associate components of the radiation detector together compactly in a portable manner, and for example adapted to be hand-held in use.

In accordance with the invention in a further aspect, a method of assembly of a radiation detector assembly comprises the steps of:

providing a scintillator, a photodetector, and optional additional components; fabricating a hermetic enclosure adapted to surround and define an enclosure volume from a plastics material;

coating and for example electroplating, a wall of the plastics material, and for example an outer wall in use, with a metal layer;

locating the scintillator and the photodetector, and optionally the additional components, within the enclosure volume;

hermetically sealing the enclosure volume.

The invention in this further aspect is thus a method of assembly of a radiation detector assembly in accordance with the first aspect of the invention, and preferred features will be understood by analogy with the foregoing description.

In particular, whilst any suitable method for fabrication of the plastics enclosure may be considered, for intricate geometries a stereolithographic printing method may be particularly preferred. Accordingly, in a preferred embodiment, the method comprises stereolithographically printing the hermetic enclosure.

In particular, although any suitable method of depositing a thin film metal coating may be envisaged, electroplating is particularly preferred.

In a convenient case, the hermetic enclosure is initially fabricated from multiple components which are assembled together prior to sealing.

For example, the hermetic enclosure is initially fabricated to comprise a body and a lid, wherein the body comprises a base and sidewalls extending upwardly from the base, and thereby, defining an enclosure volume. The fabrication method then comprises locating the scintillator, the photodetector, and optional further components into the enclosure volume defined by the body, placing the lid in position, and hermetically sealing the lid. The lid may be sealed by a sealing adhesive may, for example by applying a curable resin adhesive such as an epoxy resin adhesive and curing the same.

The hermetic enclosure is preferably assembled and sealed in an inert environment, and for example a nitrogen environment. The hermetic enclosure may for example be assembled and sealed in an inert glovebox.

Other preferred features of the method will be understood by analogy.

BRIEF DESCRIPTION OF DRAWINGS

The invention will now be described by way of example only with reference to FIGS. 1 to 3 of the accompanying drawings, in which.

DETAILED DESCRIPTION

Figure 1:
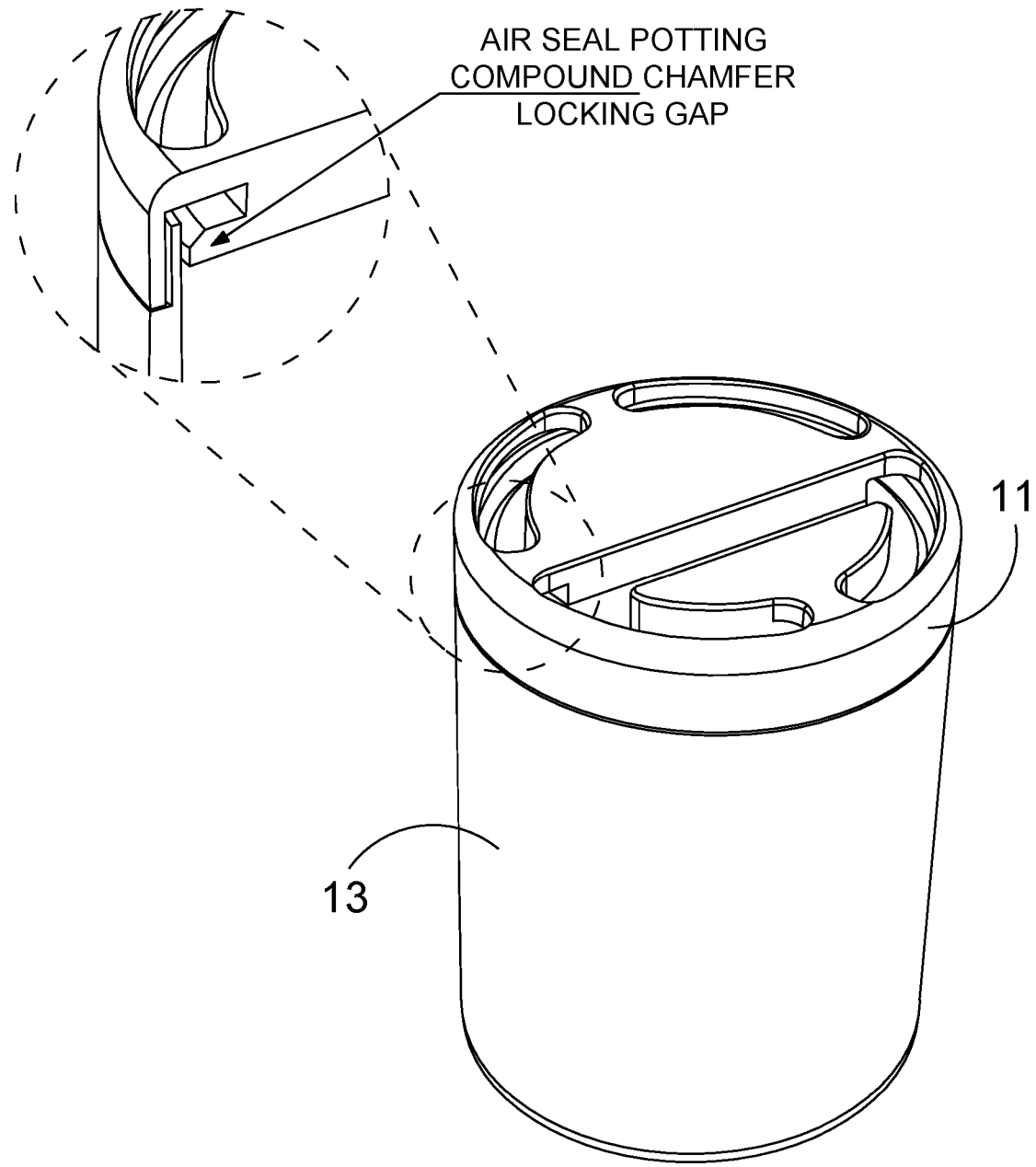
FIG. 1 is a perspective view of a first embodiment of an enclosure in accordance with the principles of the invention.
Figure 2:
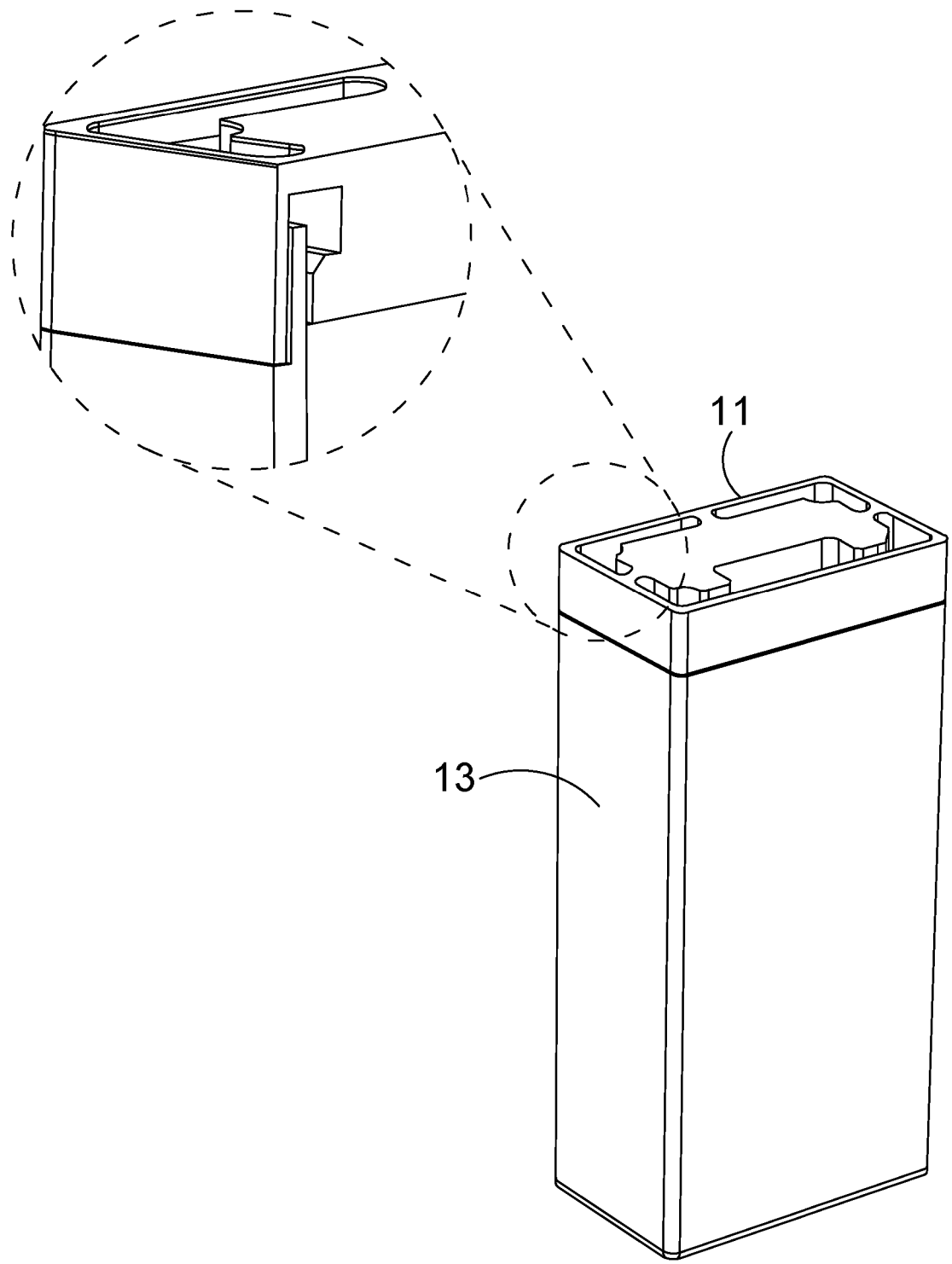
FIG. 2 is a perspective view of a second embodiment of an enclosure in accordance with the principles of the invention.

FIGS. 1 and 2 show respectively a cylindrical and a cuboid can suitable for containing a scintillator material, and in particular a fragile and/or hygroscopic scintillator material, together with a suitable photodetector, and in particular a compact solid-state photodetector such as a SiPM, in a single hermetically sealed enclosure, optionally additionally with appropriate signal processing and power supply circuitry associated with the detector.

In an example embodiment, a CLLB scintillator crystal is used together with a SiPM photodetector.

In each of the example embodiments, the enclosure is fabricated initially in two parts, comprising a can body (13) and a can lid (11). The body and the lid comprise thin walled plastic enclosures coated and for example electroplated with a thin metal layer to provide low weight, high strength, compactness and complete flexibility in design to fit almost any scintillator shape in a minimum overall size.

The thin metal layer coating provides the hermetic seal, while the thin walled plastics materials form the primary structure of the body and lid of the enclosure. This allows use of formability into complex shapes and reduced weight. The use of a thin layer only of metal not only reduces the overall weight but also minimises attenuation of incoming gamma radiation.

To effect assembly, the scintillator crystal, SiPM, and other signal processing and power supply circuitry associated with the detector, are placed within the enclosure volume defined by the can body, and the lid is bonded hermetically to the can to close the enclosure, for example with a suitable high integrity adhesive such as epoxy. The two part can is easy to assemble with no moving mechanical parts or screws, being sealed via the epoxy resin, and for example optionally additionally being provided with snap fit locating connection structures.

In the embodiment, as shown in the inset of FIGS. 1 and 2, the lid includes a carefully designed channel to enable an epoxy or like air seal material to be introduced to provide optimised adhesion to the can. The lid also provides an entry port for signal and power connection which is also sealed with epoxy and completion of the assembly to complete the hermetic seal of the internal enclosed volume.

The plastics components of both enclosure embodiments are SLA printed, although other manufacturing methods might be applied. The walls are designed to have a minimum thin walls thickness, for example for the compact and portable applications being envisaged, having a wall thickness in the range of 0.5 mm to 5 mm.

In the embodiments, the external surfaces are then provided with a technical nickel coating which strengthens the 3D print creating a robust airtight enclosure for the contained scintillator crystal.

The resulting assembly may exhibit excellent thermal stability, strength and robustness in combination with low weight, potential for compactness and flexibility in design. It avoids many of the compromises associated with the use of machined aluminium cans in the prior art.

Figure 3:
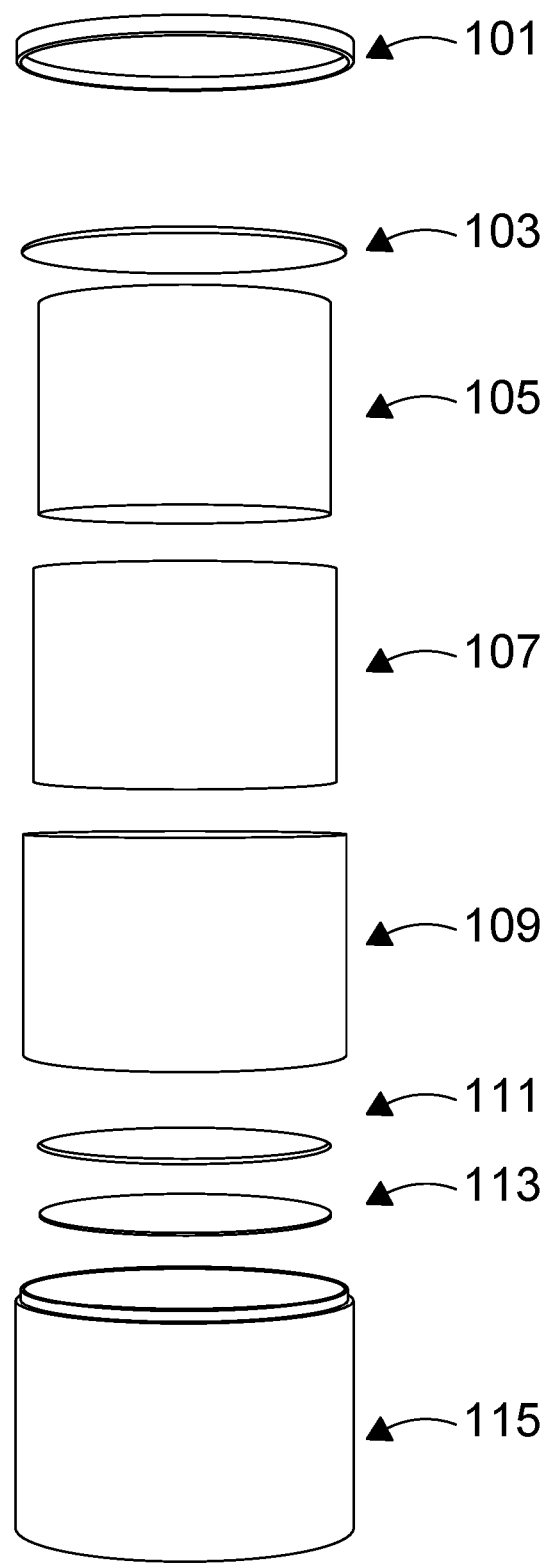
FIG. 3 is an exploded view of an assembly including a photodetector and a scintillator incorporated into an enclosure such as illustrated in FIG. 1.

An example of the internal components assembled within a can body such as illustrated in FIG. 1 is shown is FIG. 3 in exploded view.

The assembly includes, from the top, a housing lid (101), a photodetector PCB and flex (103), an inorganic crystalline scintillator which in the embodiment is CLLB (105), a PTFE wrapping layer (107) and reflective foil wrapping layer sitting outside the PTFE layer in use (109), a PTFE base layer (111), a neoprene support layer (113), and a housing body (115).

When suitably assembled, the outer cylindrical surface of the scintillator is consequently covered first by the PTFE layer and then by the reflective foil layer. The combined effect of this composite covering is to produce in combination: the high diffusing behaviour of conventional expanded PTFE wrapping without the disadvantage of the conventionally required thickness; and the high reflectivity of the foil layer while mitigating the disadvantages usually associated with the specular nature of the reflectivity of such foils. In consequence, a layer thickness of around 200-300 µm is achievable, and the whole assembly is particularly adapted to compact construction which can readily be incorporated into portable and for example hand-held detectors.

Other combinations of a layer of flexible polymeric material and layer of reflective foil, and optional further layers, will readily suggest themselves. The layers are preferably juxtaposed such that the flexible polymeric material is disposed closer to an external surface of the inorganic crystalline scintillating material and the layer reflective foil is disposed more distantly from the inorganic crystalline scintillating material and for example constitutes an outer surface of the wrapping.

The composite film of the embodiment thus uses a thin layer specularly reflective foil and a thin layer of diffusing material to provide both high diffusing behaviour and high reflectivity in a wrapping that requires much less thickness.

The assembly of FIG. 3 may then be placed within a can body such as illustrated in FIGS. 1 and 2.

The invention claimed is:

1. A radiation detector assembly comprising:
   a scintillator, comprising a scintillating material;
   a photodetector;
   a hermetic enclosure surrounding and defining an enclosure volume that contains the scintillator and the photodetector, wherein the hermetic enclosure comprises a housing body and a housing lid with a channel adapted to receive the housing body;
   wherein the enclosure comprises a wall of plastics material coated with a metal layer placed inside the housing body, wherein the wall of plastics material comprises a PTFE wrapping layer, wherein the metal layer comprises a reflective layer.

2. A radiation detector assembly according to claim 1 wherein the wall of plastics material is electroplated with a metal layer.

3. A radiation detector assembly according to claim 1 wherein the wall of plastics material is fabricated from a photocurable polymer.

4. A radiation detector assembly according to claim 1 wherein the wall of plastics material is fabricated by stereolithographic printing.

5. A radiation detector assembly according to claim 1 wherein the metal layer is applied to an external surface of the enclosure.

6. A radiation detector assembly according to claim 1 wherein the metal layer is formed as a thin film.

7. A radiation detector assembly according to claim 1 wherein the metal layer is no more than 1 mm thick.

8. A radiation detector assembly according claim 7 wherein the metal layer has a thickness between 5 μm and 300 μm.

9. A radiation detector assembly according to claim 1 wherein the metal layer comprises plural layers of the same or different composition.

10. A radiation detector assembly according to claim 1 wherein the metal layer comprises one or more of copper, zinc, chromium, silver, gold and alloys thereof and combinations of layers thereof.

11. A radiation detector assembly according to claim 1 wherein the coating thickness is between 5 mm and 300 mm.

12. A radiation detector assembly according claim 1 wherein the enclosure further comprises, assembled together, a body and a lid, wherein the body comprises a base and side walls primarily defining the enclosure volume, onto which the lid may be applied and sealed into place.

13. A radiation detector in accordance with claim 1 wherein the scintillating material is an inorganic crystalline scintillating material.

14. A radiation detector in accordance with claim 13 wherein the inorganic scintillating material is selected from one or more of: doped alkali halides, other slow inorganics, and Ce'-activated fast inorganics.

15. A method of assembly of a radiation detector assembly comprising:

providing a scintillator and a photodetector;

fabricating a hermetic enclosure adapted to surround and define an enclosure volume from a plastics material, wherein the hermetic enclosure comprises a housing body and a housing lid with a channel adapted to receive the housing body;

coating a wall of the plastics material with a metal layer placed inside the housing body, wherein the wall of plastics material comprises a PTFE wrapping layer, wherein the metal layer comprises a reflective layer;

locating at least the scintillator and the photodetector within the enclosure volume;

hermetically sealing the enclosure volume.

16. A method in accordance with claim 15 wherein the coating a wall of the plastics material with a metal layer comprises electroplating.

17. A method in accordance with claim 15 wherein the coating a wall of the plastics material with a metal layer comprises coating an outer wall.

18. A method in accordance with claim 15 wherein the hermetic enclosure is fabricated by a stereolithographic printing method.

19. A method in accordance with claim 15 wherein the hermetic enclosure is initially fabricated from multiple components which are assembled together prior to sealing.

20. A method in accordance with claim 19 wherein the hermetic enclosure is initially fabricated to comprise a body and a lid, wherein the body comprises a base and sidewalls extending upwardly from the base, and the fabrication method comprises locating the scintillator, the photodetector, and optional further components into the enclosure volume defined by the body, placing the lid in position, and hermetically sealing the lid.

* * * * *